(12) United States Patent
Wermelinger et al.

(10) Patent No.: US 10,179,437 B2
(45) Date of Patent: Jan. 15, 2019

(54) CHAMBER COUPLER

(71) Applicant: Georg Fischer Rohrleitungssysteme AG, Schaffhausen (CH)

(72) Inventors: Joerg Wermelinger, Schaffhausen (CH); Oliver Hein, Langwiesen (CH)

(73) Assignee: Georg Fischer Rohrleitungssysteme AG (CH)

( * ) Notice: Subject to any disclaimer, the term of this patent is extended or adjusted under 35 U.S.C. 154(b) by 202 days.

(21) Appl. No.: 15/274,093

(22) Filed: Sep. 23, 2016

(65) Prior Publication Data

US 2017/0113401 A1 Apr. 27, 2017

(30) Foreign Application Priority Data

Oct. 27, 2015 (EP) .................................. 15191594

(51) Int. Cl.
*F16L 47/03* (2006.01)
*B29C 65/22* (2006.01)
(Continued)

(52) U.S. Cl.
CPC ........ *B29C 65/221* (2013.01); *B29C 65/3468* (2013.01); *B29C 66/1122* (2013.01); *B29C 66/342* (2013.01); *B29C 66/3472* (2013.01); *B29C 66/5221* (2013.01); *B29C 66/52295* (2013.01); *B29C 66/52298* (2013.01); *B29C 66/71* (2013.01); *B29C 66/73921* (2013.01); *B29C 66/8262* (2013.01); *B29C 66/8266* (2013.01); *F16L 13/0227* (2013.01); *F16L 13/0236* (2013.01); *F16L 47/03* (2013.01);
(Continued)

(58) Field of Classification Search
CPC ....................................................... F16L 47/03
USPC ................................................ 285/21.2, 106
See application file for complete search history.

(56) References Cited

U.S. PATENT DOCUMENTS 4,090,899 A 5/1978 Reich
4,436,987 A * 3/1984 Thalmann ............... F16L 47/03
285/21.3
(Continued)

FOREIGN PATENT DOCUMENTS

BE 1005527 A3 9/1993
DE 3808229 A1 9/1989
(Continued)

OTHER PUBLICATIONS

Extended European Search Report issued by the European Patent Office (EPO) dated May 19, 2016 regarding corresponding EP Application No. 15191594.9 (7 pages).

*Primary Examiner* — David Bochna
(74) *Attorney, Agent, or Firm* — Harness, Dickey & Pierce, P.L.C.

(57) ABSTRACT

Electric welding coupler for the welding of pipes made of thermoplastic material or other weldable plastics comprising a cylindrical body made of thermoplastic material or other weldable plastics, containing at least one welding element, wherein the welding element is arranged close to the inner diameter of the cylindrical body, wherein the welding element forms at least two welding zones, a contact for feeding the electric current and at least one cavity, wherein the cavity is arranged in the cylindrical body, wherein a reinforcing ring is arranged around the outer circumference respectively outer diameter of the cylindrical body.

13 Claims, 3 Drawing Sheets

(51) Int. Cl.
    *B29C 65/00*     (2006.01)
    *F16L 13/02*     (2006.01)
    *B29C 65/34*     (2006.01)
    *B29K 101/12*     (2006.01)
    *B29L 23/00*     (2006.01)
    *B29K 105/06*     (2006.01)
    *B29K 705/00*     (2006.01)

(52) U.S. Cl.
    CPC ...... *B29C 65/3428* (2013.01); *B29C 65/3432* (2013.01); *B29C 65/3488* (2013.01); *B29K 2101/12* (2013.01); *B29K 2105/06* (2013.01); *B29K 2705/00* (2013.01); *B29L 2023/22* (2013.01)

(56) References Cited

U.S. PATENT DOCUMENTS

| | | | | |
|---|---|---|---|---|
| 4,727,242 | A * | 2/1988 | Barfield | F16L 47/03 285/21.2 |
| 4,869,533 | A * | 9/1989 | Lehmann | F16L 47/03 285/21.2 |
| 5,252,157 | A * | 10/1993 | Inhofe, Jr. | F16L 47/03 285/21.2 |
| 5,366,253 | A * | 11/1994 | Nakashiba | F16L 47/03 285/21.2 |
| 2015/0076809 | A1* | 3/2015 | Barnes | F16L 47/03 285/21.2 |

FOREIGN PATENT DOCUMENTS

| KR | 20100098189 A | 9/2010 |
|---|---|---|
| WO | WO-2010-064832 A2 | 6/2010 |

\* cited by examiner

CHAMBER COUPLER

CROSS-REFERENCE TO RELATED APPLICATIONS

This application claims the benefit and priority of EP Application No. 15 191 594.9, filed Oct. 27, 2015. The entire disclosure of the above application is incorporated herein by reference.

BACKGROUND OF THE INVENTION

Technical Field

Electric welding couplers for the welding of pipes made of thermoplastic material or other weldable plastics comprising a cylindrical body made of thermoplastic material or other weldable plastics, containing at least one welding element; wherein the welding element is arranged close to the inner diameter of the cylindrical body, wherein the welding element forms at least two weld zones, a contact for feeding the electric current and at least one cavity, wherein the cavity is arranged in the cylindrical body.

Discussion

Mainly in recent years, for weight and corrosion reasons, pipelines made of thermoplastic materials have been increasingly used in pipeline constructions, more specifically for the construction of pipeline networks for gas and water supplies, as well as for the conveyance of air, waste water, or else chemicals. The pipelines used are generally made of pressure-resistant plastic. For reasons of quality and efficiency, electric welding couplers are often used to connect such pipelines. The greater the pipe diameter of the pipelines to be connected, the more effort is required to connect the individual pipeline components. Since, in the case of large pipe cross sections, the gap between pipeline and Electric welding coupler is relatively large, the preconditions for optimal welding are hardly available. In the case of narrow production tolerances, in which a small gap formation between the pipe outer diameter and the coupler inner diameter is achieved, the problem of introducing the pipe into the Electric welding coupler exists. The greater is the diameter of the pipeline, the more the pipes inclined to ovality and are hence unable to be introduced into the coupler. Apart from the gap and the ovality of the pipes, there is the further problem of cavitation in the welding zone. In the welding of electric welding couplers, more specifically in the case of large diameters, blowholes arise in the welding zone following cooling, which blowholes can in some circumstances adversely affect the strength of the weld joint. Blowholes are formed by the volume shrinkage of the melt during hardening of the plastic, or else by the irregular expansion of the melt, in that boundary points first connect to the pipe to be welded and the trapped air there between hence no longer has a chance to escape.

Electric welding couplers which try to eliminate the problem of cavitation by applying a high pressure to the weld are known from the prior art.

WO 2010 064 832 discloses a fusion-type connection member for the welding of pipes. The connection member containing a hollow part on the inner circumference of the body into which air is introduced during the welding process. This increases the pressure of the electrothermal wire and reduces the annular gap between the inner circumference of the connection member and the outer circumference of the pipes to be joined.

The drawback of this connection member is that, it is easier for the outer circumference to expand than to bring a high pressure on the inner circumference, therefore the pressure on the electrothermal wire on the warmed plastic is not very high.

SUMMARY OF THE INVENTION

An aspect of the invention is to propose an electric welding coupler which brings an additional pressure on the heating element respectively on the inner circumference of the inner ring and a reduction of the annular gap between the inner diameter of the coupler and the outer diameter of the pipe ends so that the welding process achieves a good weld without blowholes and an optimal strength of the welded joint.

This aspect is achieved according to the invention by the arrangement of a reinforcing ring around the outer circumference of the cylindrical body.

The reinforcing ring forms a rigid cover around the cylindrical body which makes it difficult for the cylindrical body to expand outwardly. Pressure is generated in a cavity between the inner and outer ring before the welding process starts to expand the inner ring. The preferred liquid pressure in the cavity is at least the dual nominal pressure of the appropriate pipe.

Due to the reducing of the inner diameter of the inner ring it contacts the pipe ends and reduces the annular gap. The reduction of the gap brings the advantage of a small amount of melt which is needed for a good welding joint. This small amount of melt has the benefit of a shorter heating time which is needed and due to the small amount of melt it generates less shrinkage during the cooling and solidification of the melt that reduces the shrinking in the welded joint. Because of such a small amount of melt is it possible to reduce the middle cold zone between the two welding zones, wherein the middle cold zone can be half as wide as standardized according to EN ISO 15494:2003 depending on the pipe diameter, wherein the strength of the welded joint is maximized. A smaller cold zone will store less eddy water and the flowing through liquid has a smaller area directly on the inner ring of the coupler which is stressed by the liquid.

The arranged reinforcing ring can be also used as carrying aid. Such coupler will be used primarily with large diameters pipes, that means they are very heavy. Due to the reinforcing ring is it possible to fasten the whole electrical welding coupler with the reinforcing ring on a crane and bring them to the right place.

In a preferred embodiment is it possible to remove the reinforcing ring after the use of the inventive electrical welding coupler and reinstalled on a next electro welding coupler with the same size for the next welding.

The inventive electric welding coupler preferably comprises a cylindrical body made of thermoplastic material or other weldable plastics. The cylindrical body is preferably formed by an outer ring and an inner ring, wherein the inner ring is concentrically arranged to the outer ring. A cavity is formed between the outer circumference of inner ring and the inner circumference of the outer ring, preferably by a recess in the outer circumference of the inner ring or in the inner circumference of the outer ring. On both sides of the inner and outer ring are side rings that are preferably welded to the inner and outer rings to form the cavity between. The cavity extends around the entire circumference between the inner and outer ring.

Before the welding process the cavity will fill up with a liquid, preferably with water. As an alternative embodiment the liquid can also include a chemical reactive system which is able to support the welding process by generation of pressurized gases and heat or by expansion to foam. A further embodiment would be also a liquid which can consist of a resin which supports the mechanical stability of the coupler after curing.

The pressure on the inner ring will be generated by the liquid. The liquid pressure is at least twice of the nominal pressure of the appropriate pipe. The wall thickness of the inner ring is preferably in the middle thicker than at the ends because the pressure acts in the middle respectively in the region of the welding elements and this brings a higher stability of the inner ring where the pressure acts.

The reinforcing ring, which hinders an expansion of the outer ring, is made of a high strength material, preferably material with at least a modulus of elasticity of 50 GPa, especially composite materials or metals. Steel is also a preferred material for the reinforcing ring. But also other materials which make the ring stable and stiff are possible.

The reinforcing ring is preferably formed by at least two parts with two half shells which will brace together. In this preferred embodiment is it possible to remove the reinforcing ring after the installation of the inventive electrical welding coupler and it's possible to reinstall the reinforcing ring on a next electrical welding coupler with the same size for the next welding. Also a chain would be possible as a reinforcing ring because a chain is formed by more than two parts.

Another embodiment of the invention has an integrated reinforcing ring at the electric welding coupler which is not removable and the reinforcing ring is preferably made in one piece.

The inventive electrical welding coupler has at least one welding element which is preferably arranged in the central region on the inner ring of the cylindrical body close to the inner circumference of the inner ring and forms at least two welding zones. Preferably are there two weld zones for the welding of each pipe end, naturally there can also be more than two of them. Preferably the welding element or the welding elements, if there are separate elements which are not connected, are formed by heating wire windings, wherein other welding elements like conductive plastic are also possible. Preferably, due to the high deformation compression of the inner ring the welding element is flexible.

It has been shown that it is advantageous if the heating wire windings are arranged wavy, preferably sinusoidal, and the inner ring can be better deformed as a result. As a result of the wavy course, the heating wire windings can be elastically deformed and the inner ring can be compressed as a result and pressed against the pipe ends.

Alternatively thereto, the option exists that the heating wire windings are meander-formed arranged, that brings also the benefit of a flexible heating element.

The illustrative embodiment of the invention is described with reference to the drawings, though the invention is not just limited to the illustrative embodiment.

DETAILED DESCRIPTION OF THE PREFERRED EMBODIMENTS

Figure 1:
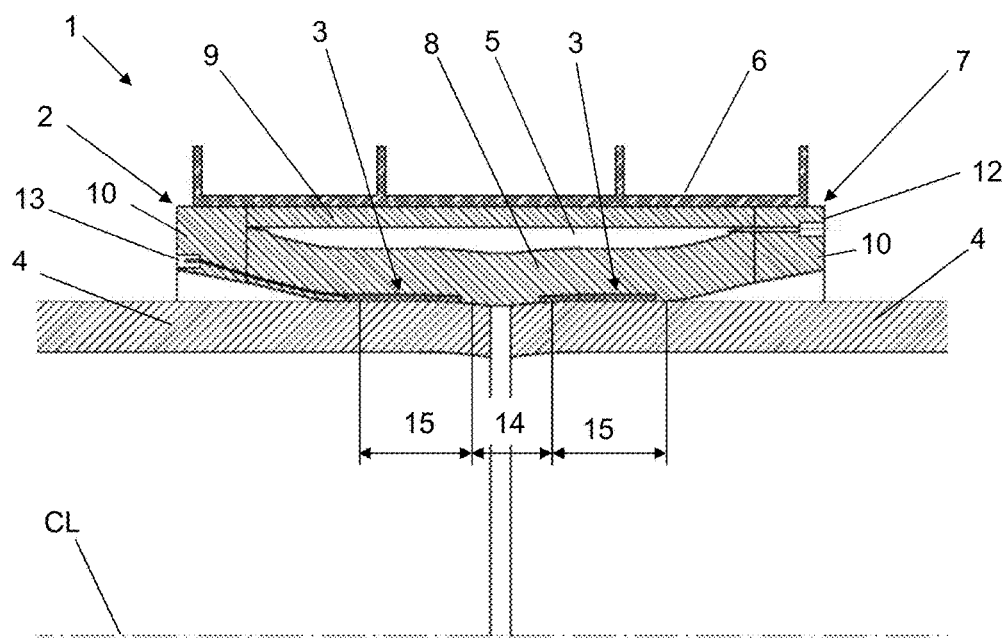
FIG. 1 shows a longitudinal section through an inventive electric welding coupler after the installation assembly.
Figure 2:
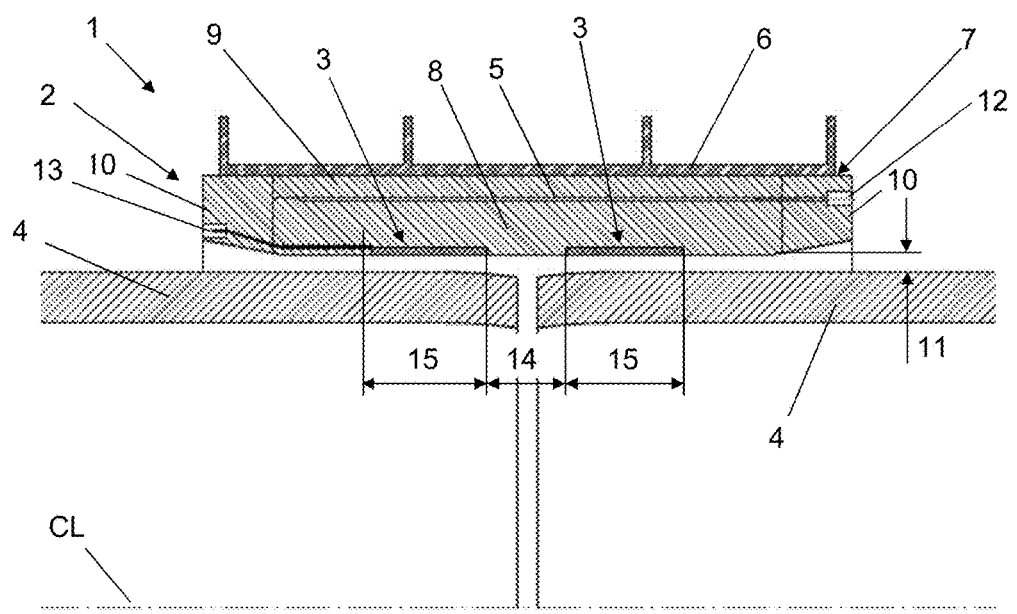
FIG. 2 shows a longitudinal section through an inventive electric welding coupler bevor the installation assembly and FIG. 3 shows a longitudinal section through an inventive electric welding coupler with in integrated reinforcing ring.

FIG. 1 shows the electric welding coupler (1) for the welding of pipe ends made of thermoplastic material or other weldable plastics. The main drawback for such joints is that such couplers must have a large gap (identified at 11 in FIG. 2) between the outer diameter of the pipe ends and the inner diameter of the coupler (1) because of the tolerances in the pipe diameters and the undesirable ovality of the pipes. The installation of the coupler (11) will be no problem if the gap (11) is enough large to insert the pipe ends easily, the gap (11) is showed in FIG. 2. But a large annular gap (11) between the pipe ends (4) and the coupler (1) hinders a good welded joint. This means, if there is a large gap before the welding process starts it generates an insufficient welding, because of the long heating time which generates a lot of melt and through the cooling of the high amount of melt and the shrinkage of this material a lot of blowholes are generated. The inventive electric welding coupler (1) shall help to overcome this disadvantage by a flexible and compressible electric welding coupler (1) provided by the cylindrical body (2). The electric welding coupler (1) comprising a cylindrical body (2) in which the pipe ends (4) will insert, shown in FIG. 2. The cylindrical body (2) comprises an inner ring (8), an outer ring (9) and two side rings (10) which are arranged on both sides of the inner and outer ring (8, 9). The inner and outer ring (8, 9) are concentrically arranged and form with the side rings (10) a cavity (5) inside the cylindrical body (2). Preferably, the inner, outer and side rings (8, 9, 10) are leak proof welded together but also other manufacturing processes are possible. The cavity (5) is designed to expand the electric welding coupler (1) to reduce the inner circumference of the inner ring (8). After the insertion of the pipe ends (4) in the electric welding coupler (1), as shown in FIG. 2, the cavity (5) is filled with a liquid, preferably water. The liquid will enter though the pressure connection (12) which is arranged on the cylindrical body (2). The preferred liquid pressure in the cavity (5) is at least the dual nominal pressure of the appropriate pipe. This liquid pressure expands the cavity (5)) which has the effect of reducing the inner circumference of the inner diameter of the inner ring (8). Consequently, the inner diameter of the inner ring (8) contacts the outer diameter of the pipe ends (4), as shown in FIG. 1. The benefit of this reducing is the reduction of the annular gap (11) and the application of pressure on the pipe ends (4). This pressure acts on the inner ring (8) and therefore also on the welding element (3) which is arranged on the inner circumference on the inner ring (8) and forms the two welding zones (15). This pressure helps to ensure a good welding. A further advantage of a small or no gap (11) is that the small amount of melt which is needed for a good welding process solidifies fast and therefore it is possible to reduce the middle cold zone (14) by half to the standardized cold zone depending on the pipe diameter. The narrow the cold zone (14) minimizes the eddy water that can accumulate in the cold zone (14) between the area of the end of the pipes (4) and the inner ring (8) which is not welded. Due to the reduction of the middle cold zone (14) the stress on the inner ring (8) is lower because the flowing medium has only an effect on a narrow area at the inner ring (8).

The feeding of the electric current to the welding element (3) which forms the welding zones (15) will achieve through a contact (13), how it is state of the art. The welding element (3) can be formed through on element which is connected in the middle and forms two welding zones (15) or it is also possibly that the coupler (1) has at least two separate welding elements (3) which have separate contacts (3) for the electric current.

Preferably the welding element (3) is formed by heating wire windings but also other heating elements are possible. Because of deformation of the inner ring (8) is it important that the welding element (3) is flexible. To achieve this effect in a heating wire winding the heating wire winding is wavy, preferably sinusoidal. The heating wire winding can be alternatively arranged in a meander-form.

The effect of the reducing of the inner circumference of the inner ring (8) through the fill up of the cavity (5) is maximized by the restriction of the expansion of the outer circumference (7) of the cylindrical body (2). To achieve this effect a reinforcing ring (6) is arranged on the outer circumference of the cylindrical body (2). FIGS. 1 and 2 show an embodiment of the reinforcing ring (6) which has some reinforcing ribs but also other variations are possible. It is important to form a stiff and stable limitation for the outer circumference (7) of the cylindrical body (2) so that the body (2) has only one possible direction to expand.

In a preferred embodiment the reinforcing ring (6) is formed by at least two parts preferably two half shells, which will brace together. This embodiment as shown in FIGS. 1 and 2 has the advantage that the reinforcing ring (6) can dismantled after the installing of the coupler (1) and can be used for a further installation. Preferably the reinforcing ring (6) is made of a high strength material preferably a material with a modulus of elasticity of at least 50 GPa. Especially preferred are composite materials or metals such as steel. Of course, are there also other materials possible.

Figure 3:
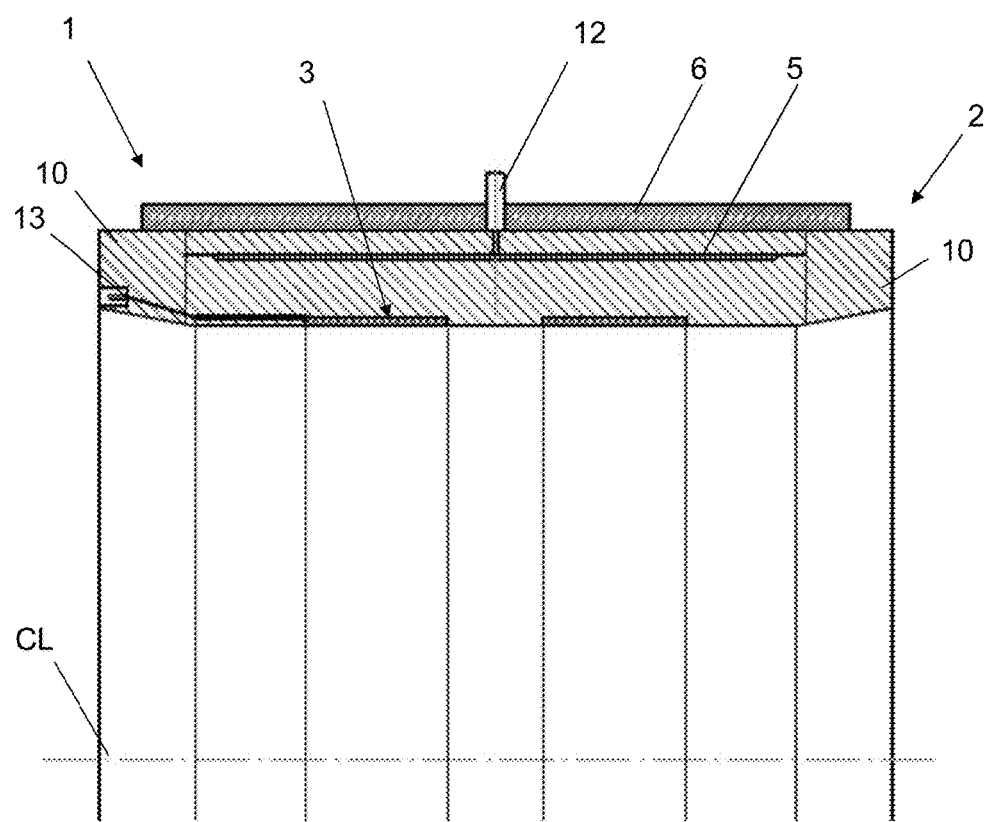

FIG. 3 shows a further embodiment of the electrical welding coupler (1). The reinforcing ring (6) cannot be dismantled from the coupler (1) after the installation. The material can be the same as in the other embodiment but in the embodiment in FIG. 3 is it possible to form the ring (8) in one piece because it must not be removable.

What is claimed is:

1. An electric welding coupler for the welding of pipes made of thermoplastic material or other weldable plastics comprising a cylindrical body made of thermoplastic material or other weldable plastics, containing at least one welding element, wherein the welding element is arranged close to the inner diameter of the cylindrical body, wherein the welding element forms at least two welding zones, a contact for feeding the electric current and at least one cavity, wherein the cavity is arranged in the cylindrical body, wherein a reinforcing ring is arranged around the outer circumference respectively outer diameter of the cylindrical body.

2. The electric welding coupler according to claim 1, wherein the cylindrical body contains an inner ring, an outer ring and two side rings, wherein the inner ring, the outer ring and two side rings are welded.

3. The electric welding coupler according to claim 1, wherein the cavity extends in the cylindrical body around the entire circumference of the cylindrical body respectively around the entire outer circumference of the inner ring.

4. The electric welding coupler according to claim 1, wherein the cavity is filled up with a liquid during the welding process.

5. The electric welding coupler according to claim 4, wherein the liquid includes a chemical reactive system which is able to support the welding process by generation of pressurized gases and/or heat or by expansion to foam.

6. The electric welding coupler according to claim 4, wherein the liquid consists of a resin, wherein the resin supports the mechanical stability of the coupler after curing.

7. The electric welding coupler according to claim 1, wherein the reinforcing ring is made of a high strength material having at least a modulus of elasticity of 50 GPa.

8. The electric welding coupler according to claim 1, wherein the reinforcing ring is formed by at least two parts.

9. The electric welding coupler according to claim 1, wherein the welding elements are formed by heating wire windings.

10. The electric welding coupler according to claim 9, wherein the heating wire windings are wavy.

11. The electric welding coupler according to claim 1, wherein the welding elements are formed from conductive plastic.

12. The electric welding coupler according to claim 1, wherein the reinforcing ring is integrated with the cylindrical body, wherein the reinforcing ring is not removable from the coupler.

13. The electric welding coupler according to claim 1, wherein between the two welding zones a relatively small middle cold zone between pipe ends is arranged.

* * * * *